United States Patent [19]
Kim

[11] Patent Number: 5,425,009
[45] Date of Patent: Jun. 13, 1995

[54] MAGNETO-OPTICAL RECORDING APPARATUS FOR A HIGH-SPEED MAGNETIC FIELD INVERSION

[75] Inventor: Kwang Kim, Seoul, Rep. of Korea

[73] Assignee: Goldstar Co., Ltd., Seoul, Rep. of Korea

[21] Appl. No.: 73,147

[22] Filed: Jun. 8, 1993

[30] Foreign Application Priority Data

Jun. 9, 1992 [KR] Rep. of Korea ................ 9941/1992

[51] Int. Cl.$^6$ .................... G11B 11/00; G11B 33/02
[52] U.S. Cl. ...................... 369/13; 369/75.2; 360/114
[58] Field of Search .............. 369/13, 75.2, 75.1, 369/77.1, 77.2, 58, 14, 78, 126, 219; 360/114, 59, 103, 66, 104, 109, 137, 105, 99.6; 365/122

[56] References Cited

U.S. PATENT DOCUMENTS

| | | | |
|---|---|---|---|
| 4,750,152 | 6/1988 | Yonekubo et al. | 369/46 |
| 5,103,435 | 4/1992 | Nemoto et al. | 369/13 |
| 5,202,863 | 4/1993 | Miyatake et al. | 369/13 |
| 5,226,024 | 7/1993 | Mukawa | 369/13 |
| 5,247,493 | 9/1993 | Kime et al. | 369/13 |

*Primary Examiner*—Georgia Y. Epps
*Assistant Examiner*—Ali Neyzari
*Attorney, Agent, or Firm*—Finnegan, Henderson, Farabow, Garrett & Dunner

[57] ABSTRACT

A magneto-optical recording apparatus including a carriage provided with a magnetic field generator and an optical pickup for recording a magneto-optical disc, a drive mechanism connected to the carriage for driving the carriage, and a guide for guiding the carriage radially of and parallel to the magneto-optical disc. The carriage is divided into an upper carriage and a lower carriage which are pivoted relative to each other. A guide bar having an upward bent portion is disposed at a side of the upper carriage. A side wing is formed at a side of the upper carriage and placed on the guide bar. The upper carriage is pivotally raised by the upward bent portion when unloading a magneto-optical disc. The optical pickup is aligned with the magnetic field generator to coincide a beam generating area with a magnetic field generating area.

7 Claims, 3 Drawing Sheets

F I G. 3
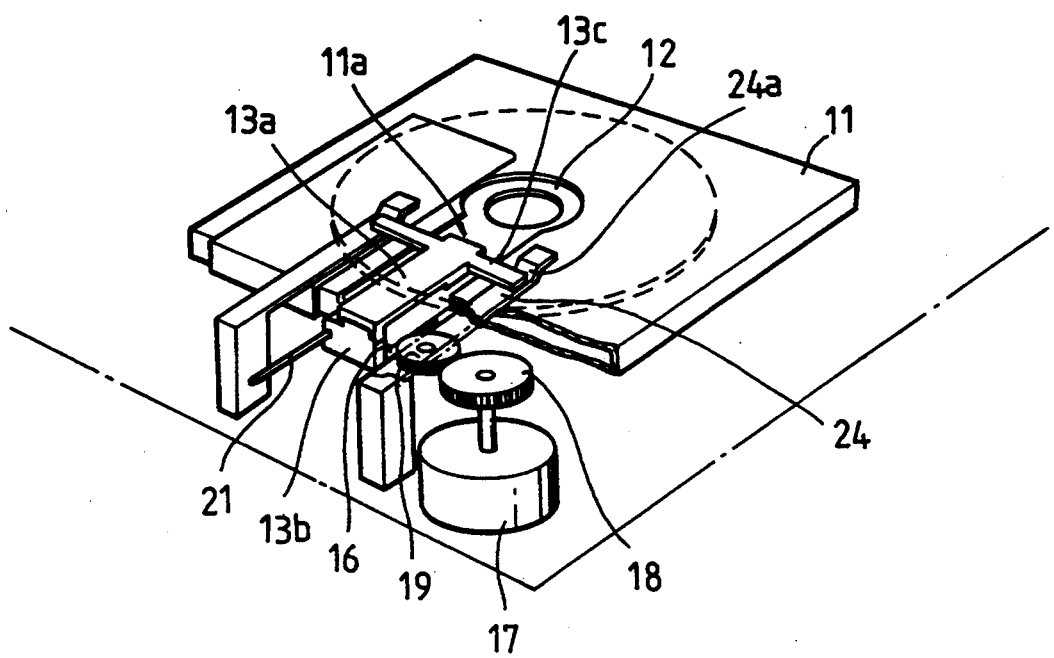
F I G. 4
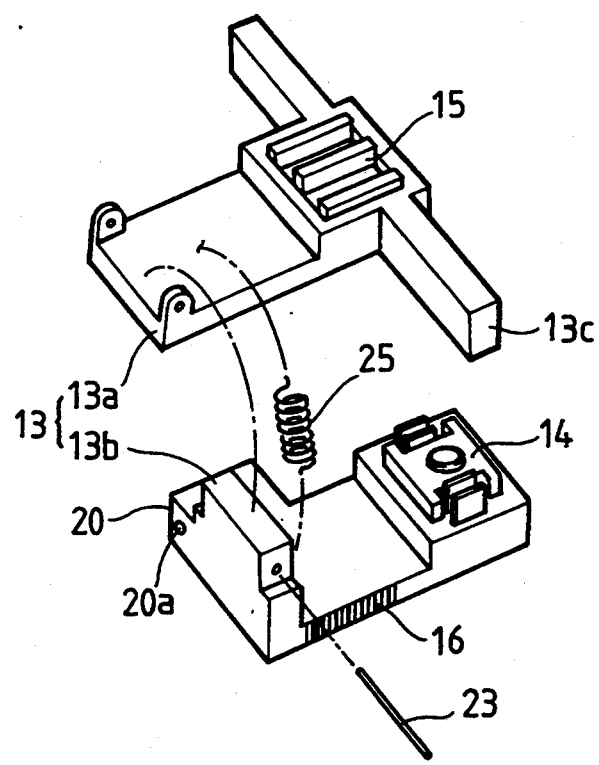

F I G. 5a
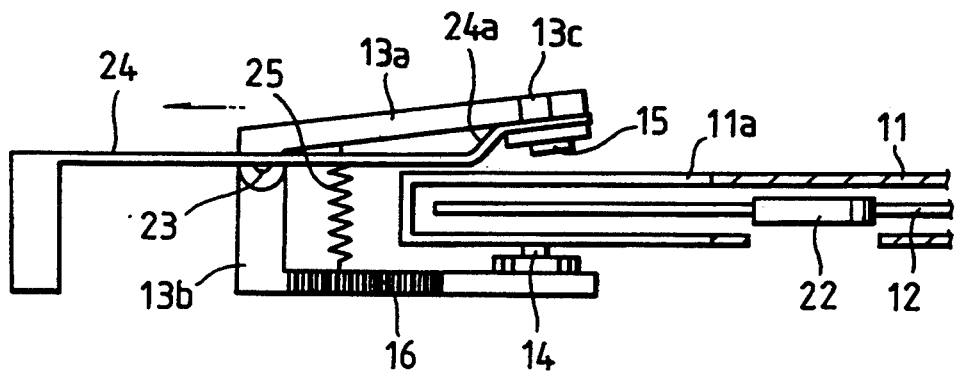
F I G. 5b
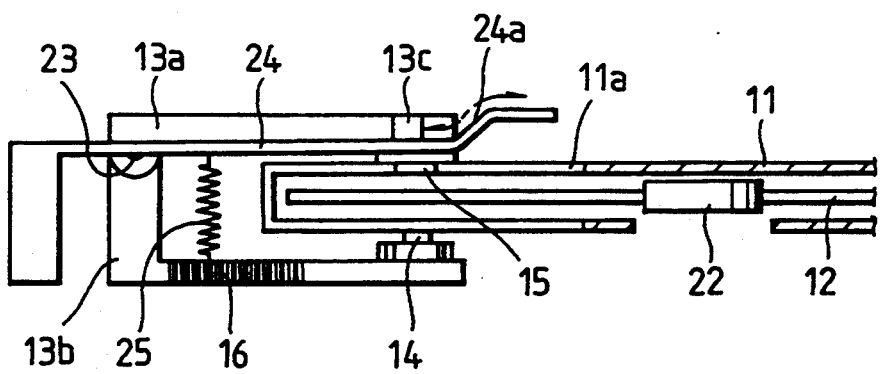

MAGNETO-OPTICAL RECORDING APPARATUS FOR A HIGH-SPEED MAGNETIC FIELD INVERSION

BACKGROUND OF THE INVENTION

1. Field of the Invention

The present invention relates to a magneto-optical recording apparatus capable of overwriting, and more particularly, to a magneto-optical recording apparatus capable of driving a magnetic field generator and an optical pickup simultaneously to allow the magnetic field generator to be compact.

2. Description of the Prior Art

Referring to FIGS. 1 and 2, a conventional magneto-optical recording apparatus is shown in the drawings, the magneto-optical recording apparatus includes a spindle motor 1 for rotating a magneto-optical disc 2 mounted on a shaft thereof, a laser driving circuit 3 disposed under and outside of the magneto-optical disc 2, and an optical pickup 4 movably connected to the laser driving circuit 3 for heating the magneto-optical recording disc 2 through a laser diode driven by the laser driving circuit 3.

Also, a magnetic field generator 6 is disposed above the magneto-optical disc 2 and magnetizes the magneto-optical disc 2 through a hole formed at a cartridge 5. Hence, the optical pickup 4 may heat the magneto-optical disc 2 by an operation of the laser diode driven by the laser driving circuit 3.

That is, the optical pickup 4 converts a beam emitted from the laser diode into a parallel beam and then applies the parallel beam to the magneto-optical disc 2 via an objective lens 4a, so that the magneto-optical disc 2 is heated to a certain temperature, thereby decreasing its coercive force. Furthermore, the coercive force becomes zero at the Curie temperature.

When the magneto-optical disc 2 is magnetized by applying a vertical magnetic field from the magnetic field generator 6 to the portion of the magneto-optical disc 2 having the thus decreased coercive force, the temperature of the magneto-optical disc 2 falls gradually to cause its coercive force increase. Accordingly, the thus increased coercive force can not be affected by even an external magnetic field.

In this case, in order to record data at high speed, magnetic field inversion of the magnetic field generator 6 must be performed at high speed and playback of the recorded data can be accomplished by detecting the Kerr rotation angle changed according to the magnetization direction through the optical pickup 4.

However, the above-mentioned conventional magneto-optical recording apparatus has disadvantages as follows. Since the magnetic field generator 6 for generating a vertical magnetic field is fixedly disposed above the magneto-optical disc 2, the magnetic field generator 6 must be larger in size in order to apply the magnetic field to an overall track of the magneto-optical disc 2. For a cartridge type of magneto-optical disc, since a distance between the magneto-optical disc 2 and the magnetic field generator 6 is relatively longer, the number of turns or amount of current required must be increased in order to generate a sufficient magnetic field. Accordingly, it is difficult to perform a high-speed magnetic field inversion due to the increased inductance.

SUMMARY OF THE INVENTION

The present invention has been made in view of the above-described problems in the prior art magneto-optical recording apparatus and an object of the invention is to provide a magneto-optical recording apparatus in which a magnetic field generator is disposed close to a magneto-optical disc and an optical pickup and the magnetic field generator are moved simultaneously to carry out a magnetic field inversion at high speed.

In accordance with the present invention, the object of the present invention can be accomplished by providing a magneto-optical recording apparatus comprising: a carriage having a magnetic field generator and at its upper portion with an optical pickup for recording a magneto-optical disc; at its lower portion means connected to the carriage for driving the carriage; and means for guiding the carriage driven by the driving means radially of and parallel to the magneto-optical disc.

The carriage may be divided into an upper carriage and a lower carriage which are pivoted relative to each other. A guide bar which is provided at its free end with an upward bent portion is disposed at a side of the upper carriage, and a side wing is formed at a side of the upper carriage and placed on the guide bar. Accordingly, the upper carriage is pivotally raised by the upward bent portion when the side wing is moved to the upward bent portion.

BRIEF DESCRIPTION OF THE DRAWINGS

These and other objects, features and advantages of the invention will become more apparent upon a reading of the following detailed specification and drawings, in which:

FIG. 3 is a perspective view of a magneto-optical recording apparatus according to the present invention;

FIG. 4 is an exploded perspective view showing an assembling operation of a carriage according to an embodiment of the invention;

FIG. 5a is a sectional view of the carriage of the invention which is in an unloading state; and FIG. 5b is a view similar to FIG. 5a which is in a loading state.

DETAILED DESCRIPTION OF THE PREFERRED EMBODIMENTS

Figure 1:
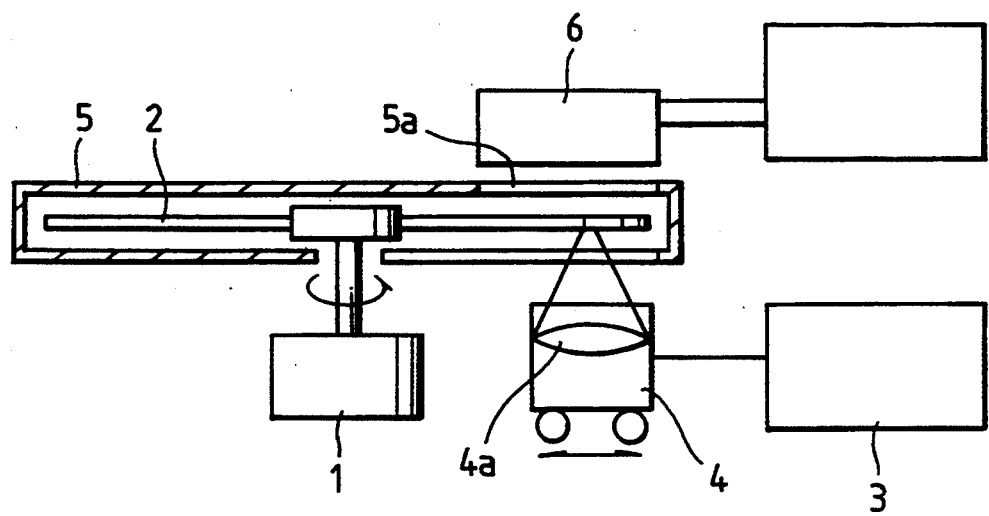
FIG. 1 is a schematic side view of a conventional magneto-optical recording apparatus.
Figure 2:
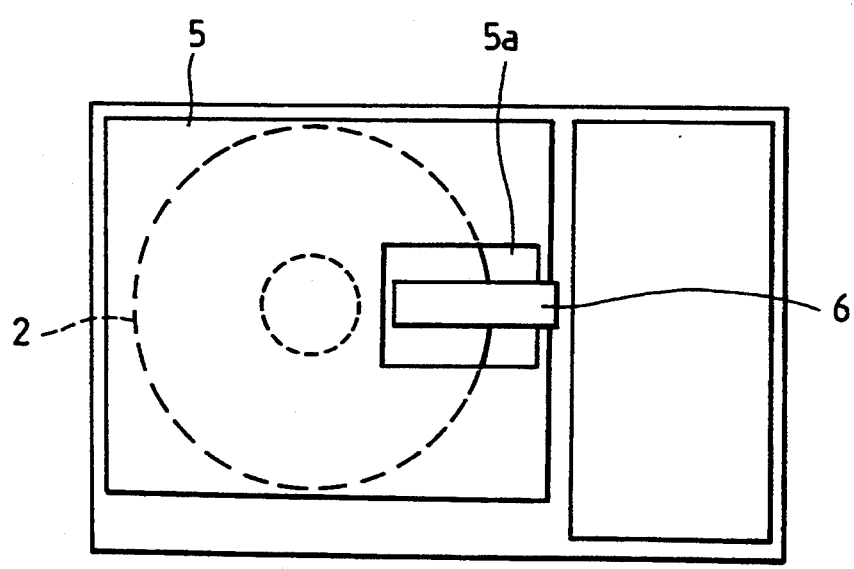
FIG. 2 is a plan view of FIG. 1.

A magneto-optical recording apparatus according to an embodiment of the present invention will now be described in detail by referring to FIGS. 3 and 4 in the accompanying drawings.

FIG. 3 shows a magneto-optical recording apparatus of the invention and FIG. 4 shows a carriage of the invention which is exploded. As shown in the drawings, a carriage 13 is disposed at a cut away portion 11a of a cartridge 11 so that the carriage 13 can be moved radially of and parallel to the magneto-optical disc 12 by a drive mechanism to record data on the magneto-optical disc 12 received in the cartridge 11 through the cut away portion 11a. The carriage 13 may be divided into an upper carriage 13a and a lower carriage 13b.

The lower carriage 13b is provided, at its free end, with an optical pickup 14 having a laser diode driven by a laser driving circuit (not shown) for applying a beam to the magneto-optical disc 12 to heat the disc. The upper carriage 13a is provided, at its free end, with a magnetic field generator 15 for magnetizing the magneto-optical disc 12 when the optical pickup 14 heats the disc 12. In this case, the optical pickup 14 and the magnetic field generator 15 are aligned with each other and mounted on the carriage 13 at positions corresponding to each other. Accordingly, when recording under the condition that the magneto-optical disc 12 has been heated by an application of a beam from the optical pickup 14, the amount of current flowing in the magnetic field generator 15 becomes smaller, thereby facilitating a high-speed magnetic field inversion.

The carriage 13 is driven by the drive mechanism such that the carriage 13 can be horizontally moved by a guide. The drive mechanism includes a motor 17, a driving gear 18 fixed to a shaft of the motor 17, a pinion 19 engaging with the driving gear 18, and a rack 16 formed at a side of the lower carriage 13b and engaging with the pinion 19.

The guide includes a projection portion 20 integrally formed with the carriage 13 and having a guide hole 20a formed in a moving direction of the carriage 13, that is, in a radial direction of the disc 12, and a guide rod 21 slidably inserted in the guide hole 20a. Thus, as the driving gear 18 is rotated by the motor 17, the carriage 13 is moved horizontally along the guide rod 21.

In an embodiment of the invention, the carriage 13 which is provided with the optical pickup 14 and the magnetic field generator 15 may be formed into a single body, so that the optical pickup 14 and the magnetic field generator 15 can be moved horizontally and simultaneously to record data on the magneto-optical disc 12.

In another embodiment of the invention, the carriage 13 may be more preferably divided into the upper carriage 13a and the lower carriage 13b, and the upper carriage 13a is pivotally mounted on the lower carriage 13b to prevent the magneto-optical disc 12 from interfering with the carriage 13 when the disc 12 is mounted to or removed from a turn table 22 (FIGS. 5a and 5b).

In the embodiment shown in FIG. 4, the lower carriage 13b having the optical pickup 14 and the upper carriage 13a having the magnetic field generator 15 are pivotally connected to each other by a pin 23. The upper carriage 13a has at its both sides a pair of side wings 13c projecting outward. A pair of guide bars 24 each having an upward bent portion 24a are disposed at both sides of the carriage 13 and under the side wings 13c so that the side wings 13c are in contact with the upper surface of the guide bar 24.

In this case, since the guide bars 24 are formed with the upward bent portions 24a, the side wings 13c and thus the upper carriage 13a are raised upward by coming into contact with the upward bent portion 24a as the carriage 13 is moved radially inwardly of the magneto-optical disc 12, thereby facilitating a replacement of the magneto-optical disc 12.

For the above upward movement of the upper carriage, only one side wing 13c may be formed at any side of the upper carriage 13a and only one guide bar 24 in contact with the side wing 13c may be disposed at the side of the upper carriage 13a. However, it is preferable that a pair of side wings 13c and a pair of guide bars 24 are provided at both sides of the upper carriage 13a for a more reliable upward movement.

In an embodiment of the invention, the upper carriage 13a and the lower carriage 13b may be connected to each other by the pin 23 and the side wings 13c may be placed on the guide bars 24 by its weight. However, in order to prevent a faulty operation due to a machining tolerance error, it is preferable that an elastic member such as a tension spring 25 be connected between the upper carriage 13a and the lower carriage 13b to bias the side wings 13c against the guide bars 24.

The operation of the above-constructed magneto-optical recording apparatus according to the invention will now be described hereinafter.

FIGS. 5a and 5b show an unloading state and a loading state of the carriage of the invention. As shown in FIG. 5a, as the side wings 13c formed at the upper carriage 13a are moved toward the disc 12 along the guide bars 24 and then come into contact with the upper surfaces of the upward bent portions 24a, the upper carriage 13a is raised upward against the tension spring 25, thereby causing the carriage 13 to be in an unloading state.

At this point, since the magnetic field generator part 15 which is fixed to the upper carriage 13a is separated from the cartridge 11, the cartridge 11 receiving the magneto-optical disc 12 can be easily removed from the carriage 13.

In the above unloading state, when another cartridge 11 is mounted on the turn table 22 and the motor 17 is applied with a power source, a reverse rotating force of the motor 17 is transmitted to the rack 16 via the driving gear 18 and the pinion 19. Accordingly, the side wings 13c of the upper carriage 13a are moved in the direction of the arrow of FIG. 5a (leftside of FIG. 5a) along the upward bent portions 24a and the guide bars 24 while the magnetic field generator 15 fixed to the upper carriage 13a maintains close to the magneto-optical disc 12.

Subsequently, as the optical pickup 14 for heating the disc 12 and the magnetic field generator 15 for magnetizing the disc 12 are operated and the motor 17 is normally rotated, the optical pickup 14 and the magnetic field generator 15 record data on the disc 12 while keeping close to the disc 12 and moving horizontally along the guide rod 21.

At this point, since the side wings 13c are moved while being in contact with the guide bars 24 by the tension spring 25, a vibration phenomenon of the side wings 13c can be prevented and current applied to the optical pickup 14 and the magnetic field generator 15 can be minimized.

After the magneto-optical disc 12 is completely recorded by the above-mentioned operation, the side wings 13c are moved toward the disc 12 and placed on the upward bent portion 24a. That is, as the side wings 13c are moved to the upward bent portion 24a as shown FIG. 5a, the upper carriage 13a is pivotally raised against the tension spring 25 so that the magnetic field generator 15 is protected when the disc 12 is removed from the carriage 13.

As apparent from the above description, since the optical pickup 14 and the magnetic field generator 15 fixed to the carriage 13 are aligned with each other, the beam generating area coincides with the magnetic field generating area. Also, since the magnetic field generator 15 is pivotally disposed close to the magneto-optical disc 12, a magnetic field sufficient recording can be generated by even a small amount of current and the high-speed magnetic field inversion can be obtained. Also, since the carriage 13 is raised and lowered by the guide bars 24 during its movement, the loading and unloading operation of the cartridge can be easily performed. Furthermore, since the motor 17 is positioned next to the carriage 13 during unloading state, the magneto-optical recording apparatus can be compact.

Although the preferred embodiment of the invention have been disclosed for illustrative purpose, those skilled in the art will appreciate that various modifications, additions and substitutions are possible, without departing from the scope and spirit of the invention as disclosed in the accompanying claims.

What is claimed is:

1. A magneto-optical recording apparatus comprising:
    a carriage having a magnetic field generator at an upper portion of the carriage and an optical pickup at a lower portion of the carriage for recording a magneto-optical disc, the upper portion of the carriage having at least one side wing, the magnetic field generator having a magnetic field generating area, and the optical pickup having a beam generating area;
    a drive mechanism connected to the carriage for moving the carriage; and
    a guide for directing movement of the carriage driven by the drive mechanism radially of and parallel to the magneto-optical disc, the guide including a lower portion, an upward slope portion, and an upper portion for sliding the side wing to pivotally move the upper portion of the carriage,
    the magnetic field generator being aligned with the optical pickup and the beam generating area coinciding with the magnetic field generating area.

2. A magneto-optical recording apparatus according to claim 1, wherein the drive mechanism comprises a motor having a shaft, a driving gear fixed to the shaft of the motor, a pinion engaging with the driving gear, and a rack formed at a side of the lower portion of the carriage for engaging with the pinion.

3. A magneto-optical recording apparatus according to claim 1, wherein the guide comprises a projection portion integrally formed with the carriage and having a guide hole formed in a moving direction of the carriage, and a guide rod slidably inserted in the guide hole, whereby as a driving gear is rotated by the drive mechanism, the carriage is moved horizontally along the guide rod.

4. A magneto-optical recording apparatus according to claim 1, wherein the upper and lower portions of the carriage are pivotable by a hinge pin.

5. A magneto-optical recording apparatus according to claim 4, wherein an elastic member is connected between the upper and lower carriages to bias the side wing against the guide bar.

6. A magneto-optical recording apparatus according to claim 4, wherein the guide includes:
    a guide bar having the upward slope portion and disposed adjacent to the upper portion of the carriage, the side wing being placed on the guide bar, and the upper carriage being pivotally raised by the upward slope portion when the side wing is moved toward the upper portion of the guide.

7. A magneto-optical recording apparatus according to claim 4, wherein
    the guide includes first and second guide bars each having at one end an upward slope portion and disposed adjacent to the upper portion of the carriage; and
    the upper portion of the carriage further includes another side wing respectively connected to another side of the upper portion of the carriage, both of the side wings being respectively placed on the guide bars, the upper carriage being pivotally raised by the upward slope portion when the side wings are moved toward the upper portion of the guide.

* * * * *